(12) United States Patent
Sekiguchi et al.

(10) Patent No.: US 9,834,631 B2
(45) Date of Patent: Dec. 5, 2017

(54) FLUOROPOLYMER PRODUCTION METHOD

(71) Applicant: DAIKIN INDUSTRIES, LTD., Osaka-shi, Osaka (JP)

(72) Inventors: Takashi Sekiguchi, Settsu (JP); Manabu Fujisawa, Settsu (JP); Ryouichi Fukagawa, Settsu (JP); Takeshi Shimono, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/892,844

(22) PCT Filed: Apr. 30, 2014

(86) PCT No.: PCT/JP2014/061981
§ 371 (c)(1),
(2) Date: Nov. 20, 2015

(87) PCT Pub. No.: WO2014/192491
PCT Pub. Date: Dec. 4, 2014

(65) Prior Publication Data
US 2016/0108159 A1    Apr. 21, 2016

(30) Foreign Application Priority Data

May 27, 2013   (JP) ................ 2013-111047

(51) Int. Cl.
| | |
|---|---|
| C08F 4/34 | (2006.01) |
| C08F 214/26 | (2006.01) |
| C08F 214/24 | (2006.01) |
| C08F 14/24 | (2006.01) |
| C08F 14/26 | (2006.01) |
| C08F 214/28 | (2006.01) |
| C08F 14/18 | (2006.01) |

(52) U.S. Cl.
CPC ............ C08F 214/26 (2013.01); C08F 14/18 (2013.01); C08F 14/24 (2013.01); C08F 14/26 (2013.01); C08F 214/262 (2013.01); C08F 214/265 (2013.01); C08F 214/28 (2013.01); C08F 4/34 (2013.01); C08F 214/24 (2013.01); C08F 214/242 (2013.01); C08F 214/245 (2013.01)

(58) Field of Classification Search
None
See application file for complete search history.

(56) References Cited

U.S. PATENT DOCUMENTS

| | | | |
|---|---|---|---|
| 6,372,870 B1 * | 4/2002 | Kitahara | ................. B32B 27/08 428/421 |
| 6,716,942 B1 | 4/2004 | Saito et al. | |
| 2007/0149733 A1 | 6/2007 | Otsuka et al. | |
| 2007/0219333 A1 | 9/2007 | Shimono et al. | |
| 2012/0015124 A1 * | 1/2012 | Kitahara | ................ C08F 214/18 428/36.9 |
| 2012/0029152 A1 * | 2/2012 | Fukuoka | .................... C08J 3/24 525/193 |

FOREIGN PATENT DOCUMENTS

| | | |
|---|---|---|
| CN | 101186665 A | 5/2008 |
| CN | 101186668 A | 5/2008 |
| CN | 102807645 A | 12/2012 |
| JP | 45-33659 B1 | 10/1970 |
| JP | 4-285602 A | 10/1992 |
| JP | 6-136218 A | 5/1994 |
| JP | 11-181027 A | 7/1999 |
| JP | 11181027 A * | 7/1999 |
| JP | 2001-26765 A | 1/2001 |
| JP | 3147397 B2 | 3/2001 |
| JP | 2002-317006 A | 10/2002 |
| JP | 2006-111722 A | 4/2006 |
| JP | 2006-111885 A | 4/2006 |
| JP | 2006-152080 A | 6/2006 |
| WO | 00/47641 A1 | 8/2000 |
| WO | 2005/063827 A1 | 7/2005 |
| WO | 2005/100420 A1 | 10/2005 |
| WO | 2009/014004 A1 | 1/2009 |
| WO | 2010/110129 A1 | 9/2010 |

OTHER PUBLICATIONS

International Preliminary Report on Patentability dated Dec. 1, 2015 in counterpart International application No. PCT/JP2014/061981.
International Search Report for PCT/JP2014/061981 dated Jul. 29, 2014.
Communication dated Oct. 20, 2016 from the European Patent Office in counterpart Application No. 14803379.8.

* cited by examiner

Primary Examiner — Richard A Huhn
(74) Attorney, Agent, or Firm — Sughrue Mion, PLLC

(57) ABSTRACT

The present invention aims to provide a method of producing a fluoropolymer, especially a fluoropolymer essentially including a tetrafluoroethylene or chlorotrifluoroethylene unit, at a higher polymerization rate with improved efficiency, the method being capable of improving the moldability in extrusion molding and suppressing discoloration. The method of producing a fluoropolymer of the present invention includes producing a fluoropolymer by polymerizing tetrafluoroethylene or chlorotrifluoroethylene in the presence of a peroxydicarbonate. The peroxydicarbonate is represented by the formula:

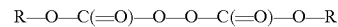

wherein R's may be the same as or different from each other and individually represent a C4 alkyl group or alkoxy alkyl group.

6 Claims, No Drawings

FLUOROPOLYMER PRODUCTION METHOD

CROSS REFERENCE TO RELATED APPLICATIONS

This application is a National Stage of International Application No. PCT/JP2014/061981 filed Apr. 30, 2014, claiming priority based on Japanese Patent Application No. 2013-111047, filed May 27, 2013, the contents of all of which are incorporated herein by reference in their entirety.

TECHNICAL FIELD

The present invention relates to a method of producing a fluoropolymer.

BACKGROUND ART

Fluoropolymers have good properties, including heat resistance and chemical resistance, owing to the fluorine atoms therein. Thus, they are used in a wide variety of fields and developed into various applications in accordance with factors such as the compositions and structures of fluoropolymers.

Patent Literature 1 discloses one method of producing such fluoropolymers comprising providing a polymer by polymerizing a vinylidene fluoride monomer in an aqueous medium using, as a polymerization initiator, an organic peroxide composition consisting of 10 to 80% by weight of a specific peroxydicarbonate and 20 to 90% by weight of methanol.

Patent Literature 2 discloses one method of producing a tetrafluoroethylene-hexafluoropropylene copolymer comprising the steps of: (1) polymerizing tetrafluoroethylene and hexafluoropropylene in an aqueous medium in the presence of diisopropyl peroxydicarbonate; and (2) fluorinating the tetrafluoroethylene-hexafluoropropylene copolymer produced in the step (1). Patent Literature 3 discloses another method of producing a fluoropolymer comprising polymerizing a fluoromonomer in an aqueous medium in the presence of an oil-soluble peroxide and a hydrocarbon emulsifier.

Further, manufacturers have produced fluororesin which is a copolymer comprising, as copolymerizable units, tetrafluoroethylene, vinylidene fluoride, and an ethylenic unsaturated monomer (other than tetrafluoroethylene and vinylidene fluoride) and which has a storage elastic modulus at 170° C. of 60 to 400 MPa measured by dynamic viscoelasticity measurement (see Patent Literature 4).

CITATION LIST

Patent Literature

Patent Literature 1: JP H04-285602 A
Patent Literature 2: WO 2009/014004
Patent Literature 3: JP 2006-111722 A
Patent Literature 4: WO 2010/110129

SUMMARY OF INVENTION

Technical Problem

As mentioned above, various fluoropolymers have been developed and the production methods for the respective fluoropolymers are also being developed simultaneously. However, there is still room for improvement in these methods of producing fluoropolymers to make these production methods more efficient.

The present invention is devised in consideration of the above situation, and it aims to provide a method of producing a fluoropolymer, especially a fluoropolymer essentially comprising a tetrafluoroethylene or chlorotrifluoroethylene unit, at a higher polymerization rate with improved efficiency, the method being capable of improving the moldability in extrusion molding and suppressing discoloration.

Solution to Problem

The present inventors have performed various studies about the method of producing a fluoropolymer essentially comprising a tetrafluoroethylene or chlorotrifluoroethylene unit at a higher polymerization rate in the polymerization reaction with improved efficiency, the method being capable of improving the moldability in extrusion molding. Then, they have focused on a polymerization initiator used in the polymerization reaction. As a result, the inventors have found that use of a peroxydicarbonate represented by the formula:

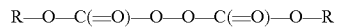

(wherein R's may be the same as or different from each other and individually represent a C4 alkyl group or alkoxy alkyl group) as a polymerization initiator particularly increases the polymerization rate in the polymerization reaction. Further, the inventors have also found that the use thereof improves the moldability in extrusion molding and prevents discoloration. As a result, the present inventors have found that the above problems can be solved by producing a fluoropolymer by polymerizing tetrafluoroethylene or chlorotrifluoroethylene in the presence of a peroxydicarbonate represented by the formula:

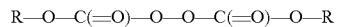

(wherein R's may be the same as or different from each other and individually represent a C4 alkyl group or alkoxy alkyl group), thereby completing the present invention.

Specifically, the present invention relates to a method of producing a fluoropolymer, comprising producing a fluoropolymer by polymerizing tetrafluoroethylene or chlorotrifluoroethylene in the presence of a peroxydicarbonate, the peroxydicarbonate being represented by the following formula:

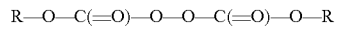

wherein R's may be the same as or different from each other and individually represent a C4 alkyl group or alkoxy alkyl group.

The peroxydicarbonate is preferably di-sec-butyl peroxydicarbonate or di-2-ethoxyethyl peroxydicarbonate.

In the producing of a fluoropolymer, the tetrafluoroethylene or the chlorotrifluoroethylene is polymerized with at least one monomer selected from the group consisting of: ethylene; chlorotrifluoroethylene; vinyl fluoride; hexafluoropropylene; hexafluoroisobutene; monomers represented by $CH_2=CX^1(CF_2)_nX^2$ (wherein $X^1$ is H or F, $X^2$ is H, F, or Cl, and n is an integer of 1 to 10); perfluoro(alkyl vinyl ethers) represented by $CF_2=CF-ORf^1$ (wherein $Rf^1$ is a C1-C10 perfluoroalkyl group or a C1-C17 perfluoroalkoxy alkyl group); and alkyl perfluorovinyl ether derivatives represented by $CF_2=CF-OCH_2-Rf^2$ (wherein $Rf^2$ is a C1-C5 perfluoroalkyl group).

In the producing of a fluoropolymer, the tetrafluoroethylene is preferably polymerized with ethylene.

In the producing of a fluoropolymer, the tetrafluoroethylene is preferably polymerized with a perfluoro(alkyl vinyl ether) represented by $CF_2=CF—ORf^1$, wherein $Rf^1$ is a C1-C10 perfluoroalkyl group or a C1-C17 perfluoroalkoxy alkyl group.

In the producing of a fluoropolymer, the tetrafluoroethylene is preferably polymerized with hexafluoropropylene.

In the producing of a fluoropolymer, the chlorotrifluoroethylene is preferably polymerized.

The polymerization is preferably performed by emulsion polymerization, suspension polymerization, solution polymerization, or bulk polymerization.

Advantageous Effects of Invention

Since the method of producing a fluoropolymer of the present invention has the above features and thus the polymerization rate in the polymerization reaction is increased, the method can produce a fluoropolymer essentially comprising a tetrafluoroethylene or chlorotrifluoroethylene unit with improved efficiency, the method being capable of improving the moldability in extrusion molding and suppressing discoloration.

DESCRIPTION OF EMBODIMENTS

The method of producing a fluoropolymer of the present invention comprises producing a fluoropolymer by polymerizing tetrafluoroethylene or chlorotrifluoroethylene in the presence of a peroxydicarbonate represented by the formula:

R—O—C(=O)—O—O—C(=O)—O—R wherein R's may be the same as or different from each other and individually represent a C4 alkyl group or alkoxy alkyl group. Still, the method may further comprise any other steps as long as it comprises the above step.

In the producing of a fluoropolymer, the peroxydicarbonate represented by the formula:

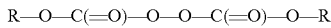

R—O—C(=O)—O—O—C(=O)—O—R (wherein R's may be the same as or different from each other and individually represent a C4 alkyl group or alkoxy alkyl group) is used as a polymerization initiator. Five or more carbon atoms in each R in the formula may cause chain transfer reactions starting from the carbon chain, so that the resulting polymer may have a low molecular weight. Three or less carbon atoms therein tend to cause generated radicals to have poor reactivity, so that the reaction rate may be insufficient.

Examples of the peroxydicarbonate include di-sec-butyl peroxydicarbonate and di-2-ethoxyethyl peroxydicarbonate.

The peroxydicarbonate may be used in the form of a dilution with methanol, an aliphatic hydrocarbon solvent, or a fluorine-containing solvent such as trichlorofluoroethane.

In the polymerization, tetrafluoroethylene (TFE) or chlorotrifluoroethylene (CTFE) is preferably polymerized with at least one monomer selected from the group consisting of ethylene (Et); chlorotrifluoroethylene (CTFE); vinyl fluoride; hexafluoropropylene (HFP); hexafluoroisobutene; monomers represented by $CH_2=CX^1(CF_2)_nX^2$ (wherein $X^1$ is H or F, $X^2$ is H, F, or Cl, and n is an integer of 1 to 10); perfluoro(alkyl vinyl ethers) (PAVE) represented by $CF_2=CF—ORf^1$ (wherein $Rf^1$ is a C1-C10 perfluoroalkyl group or a C1-C17 perfluoroalkoxy alkyl group, preferably a C5-C10 perfluoroalkyl group or a C4-C17 perfluoroalkoxy alkyl group); and alkyl perfluorovinyl ether derivatives represented by $CF_2=CF—OCH_2—Rf^2$ (wherein $Rf^2$ is a C1-C5 perfluoroalkyl group). In particular, the TFE or the CTFE is more preferably polymerized with at least one monomer selected from the group consisting of ethylene; chlorotrifluoroethylene; hexafluoropropylene; monomers represented by $CH_2=CX^1(CF_2)_nX^2$ (wherein $X^1$ is H or F, $X^2$ is H, F, or Cl, and n is an integer of 1 to 10); and perfluoro(alkyl vinyl ethers).

A monomer to be copolymerized with tetrafluoroethylene is preferably at least one selected from the group consisting of ethylene, chlorotrifluoroethylene, perfluoro(alkyl vinyl ethers), and hexafluoropropylene. A particularly preferred combination is a combination of tetrafluoroethylene and ethylene, a combination of tetrafluoroethylene and chlorotrifluoroethylene, a combination of tetrafluoroethylene and a perfluoro(alkyl vinyl ether), a combination of tetrafluoroethylene and hexafluoropropylene, or a combination of tetrafluoroethylene, ethylene, and hexafluoropropylene.

Tetrafluoroethylene can lead to a particularly high polymerization rate. Thus, the polymerization is preferably performed such that the proportion of the tetrafluoroethylene in 100 mol % of all the polymer units constituting the resulting fluoropolymer is 99 to 40 mol %, and more preferably 98.5 to 50 mol %.

In the polymerization, chlorotrifluoroethylene may also be polymerized. In this case, a monomer copolymerizable with chlorotrifluoroethylene may be polymerized in addition to the chlorotrifluoroethylene to the extent that the monomer does not deteriorate the effects of the present invention.

Examples of the monomer copolymerizable with chlorotrifluoroethylene include HFP; vinyl monomers represented by $Cz^1Z^2=CZ^3(CF_2)_mZ^4$ (wherein $Z^1$, $Z^2$, and $Z^3$ may be the same as or different from each other, and individually represent a hydrogen atom or a fluorine atom, $Z^4$ is a hydrogen atom, a fluorine atom, or a chlorine atom, and m is an integer of 2 to 10); perfluoro(alkyl vinyl ethers) represented by $CF_2=CF—ORf^1$ (wherein $Rf^1$ is a C1-C10 perfluoroalkyl group or a C1-C17 perfluoroalkoxy alkyl group); and alkyl perfluorovinyl ether derivatives represented by $CF_2=CF—OCH_2—Rf^2$ (wherein $Rf^2$ is a C1-C5 perfluoroalkyl group).

Chlorotrifluoroethylene can also lead to a particularly high polymerization rate. Thus, the polymerization is preferably performed such that the proportion of the chlorotrifluoroethylene in 100 mol % of all the polymer units constituting the resulting fluoropolymer is 100 mol %. Alternatively, the polymerization may preferably be performed such that the proportion of the chlorotrifluoroethylene is 99.9 to 90 mol %, more preferably 99.9 to 95 mol %, and still more preferably 99.8 to 96 mol %.

In order to improve the thermal stability of the fluoropolymer, the production method of the present invention may further comprise bringing the fluoropolymer into contact with ammonia or an ammonium salt. Such a contact with ammonia or an ammonium salt can convert an unstable terminal group at an end of the main chain into a stable —$CONH_2$ group.

In order to improve the thermal stability of the fluoropolymer, the production method of the present invention may further comprise bringing the fluoropolymer into contact with fluorine gas. Such a contact with fluorine gas can convert an unstable terminal group at an end of the main chain into a stable —$CF_3$ group.

The fluoropolymer is preferably a fluororesin, more preferably at least one selected from the group consisting of TFE/PAVE copolymers (PFA), TFE/HFP copolymers (FEP), Et/TFE copolymers (ETFE), CTFE/TFE copolymers, TFE/Et/HFP copolymers (EFEP), and CTFE homopolymers (PCTFE), and still more preferably at least one selected from the group consisting of PFA, FEP, ETFE, and PCTFE.

The PFA may be of any type, and it is preferably a copolymer satisfying a ratio by mole between the TFE unit and the PAVE unit (TFE unit/PAVE unit) of 70 to 99/30 to 1. The ratio by mole therebetween is more preferably 80 to 98.5/20 to 1.5. Too small a proportion of the TFE unit tends to cause poor mechanical properties, whereas too large a proportion thereof tends to cause too high a melting point, resulting in poor moldability.

The PFA is also preferably a copolymer consisting of 0.1 to 10 mol % of a monomer unit derived from a monomer copolymerizable with both TFE and PAVE and 90 to 99.9 mol % of the TFE and PAVE units.

Examples of the monomer copolymerizable with both TFE and PAVE include HFP; vinyl monomers represented by $CZ^1Z^2\!=\!CZ^3(CF_2)_m Z^4$ (wherein $Z^1$, $Z^2$, and $Z^3$ may be the same as or different from each other, and individually represent a hydrogen atom or a fluorine atom, $Z^4$ is a hydrogen atom, a fluorine atom, or a chlorine atom, and m is an integer of 2 to 10); perfluoro(alkyl vinyl ethers) represented by $CF_2\!=\!CF\!-\!ORf^1$ (wherein $Rf^1$ is a C1-C10 perfluoroalkyl group or a C1-C17 perfluoroalkoxy alkyl group); and alkyl perfluorovinyl ether derivatives represented by $CF_2\!=\!CF\!-\!OCH_2\!-\!Rf^2$ (wherein $Rf^2$ is a C1-C5 perfluoroalkyl group).

The FEP may be of any type, and it is preferably a copolymer satisfying a ratio by mole between the TFE unit and the HFP unit (TFE unit/HFP unit) of 70 to 99/30 to 1. The ratio by mole therebetween is more preferably 80 to 97/20 to 3. Too small a proportion of the TFE unit tends to cause poor mechanical properties, whereas too large a proportion thereof tends to cause too high a melting point, resulting in poor moldability.

The FEP is also preferably a copolymer consisting of 0.1 to 10 mol % of a monomer unit derived from a monomer copolymerizable with both TFE and HFP and 90 to 99.9 mol % of the TFE and HFP units. Examples of the monomer copolymerizable with both TFE and HFP include PAVE and the aforementioned alkyl perfluorovinyl ether derivatives.

The ETFE is preferably a copolymer satisfying a ratio by mole between the TFE unit and the Et unit (TFE unit/Et unit) of 20 to 90/80 to 10. The ratio by mole therebetween is more preferably 37 to 85/63 to 15, and the ratio by mole therebetween is still more preferably 38 to 80/62 to 20.

The ETFE may be a copolymer comprising TFE, Et, and a monomer copolymerizable with both TFE and Et.

Examples of the monomer copolymerizable with both TFE and Et include monomers represented by any of the following formulas:

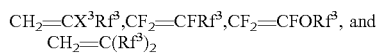

wherein $X^3$ is a hydrogen atom or a fluorine atom, and $Rf^3$ is a fluoroalkyl group which may optionally have an oxygen atom which serves as an ether bond. In particular, the monomer is preferably at least one selected from the group consisting of fluorovinyl monomers represented by any of $CF_2\!=\!CFRf^3$, $CF_2\!=\!CFORf^3$, and $CH_2\!=\!CX^3Rf^3$, and more preferably at least one selected from the group consisting of HFP; perfluoro(alkyl vinyl ethers) represented by $CF_2\!=\!CFORf^4$ (wherein $Rf^4$ is a C1-C10 perfluoroalkyl group or a C1-C17 perfluoroalkoxy alkyl group); and fluorovinyl monomers represented by $CH_2\!=\!CX^3Rf^5$ (wherein $Rf^5$ is a C1-C8 fluoroalkyl group).

Examples of the fluorovinyl monomers include $CH_2\!=\!CH\!-\!C_4F_9$, $CH_2\!=\!CF\!-\!CF_2\!-\!CF_2\!-\!CF_2H$, $CH_2\!=\!CH\!-\!C_6F_{13}$, and $CH_2\!=\!CH\!-\!C_8F_{15}$.

The monomer copolymerizable with both TFE and Et may be an unsaturated aliphatic carboxylic acid such as itaconic acid or itaconic anhydride.

The ETFE comprises preferably 0.1 to 10 mol %, more preferably 0.1 to 5 mol %, and particularly preferably 0.2 to 4 mol % of a monomer unit derived from the monomer copolymerizable with both TFE and Et.

In order to achieve good heat resistance, the amount of the TFE unit in the ETFE is preferably 50 to 80 mol %, more preferably 51 to 75 mol %, and still more preferably 52 to 70 mol % based on all the monomer units constituting the ETFE.

The PCTFE is preferably a homopolymer consisting only of CTFE, and it may be a copolymer consisting of CTFE and a monomer copolymerizable with CTFE.

Examples of the monomer copolymerizable with CTFE include those as mentioned above.

The proportion of the monomer unit derived from the monomer copolymerizable with CTFE in the PCTFE is preferably 0 mol %. Alternatively, the proportion thereof is also preferably 0.1 to 10 mol %, more preferably 0.1 to 5 mol %, and still more preferably 0.2 to 4 mol %.

The amounts of the monomers in the above copolymers can be calculated by any combination of NMR, FT-IR, elemental analysis, and X-ray fluorescence analysis in accordance with the types of the monomers.

The fluororesin preferably has a melting point of 160° C. to 320° C. The melting point is more preferably 180° C. or higher, and still more preferably 210° C. or higher, whereas the melting point is more preferably 300° C. or lower, and still more preferably 270° C. or lower.

The melting point is a temperature corresponding to the maximum value on a heat-of-fusion curve drawn using a differential scanning calorimeter (DSC) at a temperature-increasing rate of 10° C./min.

Each of the PFA and the FEP preferably has a melt flow rate (MFR) at 372° C. of 0.1 to 100 g/10 min. The MFR is more preferably 0.5 g/10 min or higher, and still more preferably 1 g/10 min or higher, whereas it is more preferably 80 g/10 min or lower, and still more preferably 45 g/10 min or lower.

The MFR is a value determined by the method in conformity with ASTM D3307.

The ETFE preferably has a melt flow rate (MFR) at 297° C. of 0.1 to 100 g/10 min. The MFR is more preferably 0.5 g/10 min or higher, and still more preferably 1 g/10 min or higher, whereas it is more preferably 80 g/10 min or lower, and still more preferably 45 g/10 min or lower.

The MFR is a value determined by the method in conformity with ASTM D3159.

The EFEP preferably has a melt flow rate (MFR) at 265° C. of 0.1 to 100 g/10 min. The MFR is more preferably 0.5 g/10 min or higher, and still more preferably 3 g/10 min or higher, whereas it is more preferably 80 g/10 min or lower, and still more preferably 45 g/10 min or lower.

The MFR is a value determined by the method in conformity with ASTM D7472.

The PCTFE preferably has a melt flow rate (MFR) at 265° C. of 0.05 to 50 g/10 min. The MFR is more preferably 0.1 g/10 min or higher, and still more preferably 0.15 g/10 min or higher, whereas it is more preferably 5 g/10 min or lower, and still more preferably 3.5 g/10 min or lower.

The MFR is a value determined by the method in conformity with ASTM D7472.

The polymerization can be performed by any known method except that the polymerization initiator is a peroxydicarbonate represented by the formula:

R—O—C(=O)—O—O—C(=O)—O—R wherein R's may be the same as or different from each other and individually represent a C4 alkyl group or alkoxy alkyl group. For example, the polymerization may be performed by emulsion polymerization, suspension polymerization, solution polymerization, or bulk polymerization. Since the above peroxydicarbonate is less likely to be hydrolyzed, it shows high initiator efficiency even in polymerization in the presence of water, and the above peroxydicarbonate is particularly suitable for emulsion polymerization and suspension polymerization.

The amount of the peroxydicarbonate represented by the formula:

R—O—C(=O)—O—O—C(=O)—O—R (wherein R's may be the same as or different from each other and individually represent a C4 alkyl group or alkoxy alkyl group) to be used in the polymerization is preferably 0.01 to 20% by mass based on 100% by mass of the resulting polymer. The peroxydicarbonate used in an amount within this range causes less discoloration and foaming in the product, and can sufficiently increase the polymerization rate of producing a fluoropolymer. The amount thereof is more preferably 0.05 to 15% by mass, still more preferably 0.1 to 10% by mass, and still further preferably 0.1 to 7% by mass.

A polymerization medium to be used in the polymerization may be any one that is capable of dispersing or dissolving the peroxydicarbonate represented by the formula:

R—O—C(=O)—O—O—C(=O)—O—R wherein R's may be the same as or different from each other and individually represent a C4 alkyl group or alkoxy alkyl group. Water, fluorine-containing organic solvents, and fluorine-free organic solvents such as alcohols, ethers, and ketones may be used alone or in any combination. Particularly preferred are fluorine-containing organic solvents because they can sufficiently dissolve tetrafluoroethylene and/or chlorotrifluoroethylene. Preferred are hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFClCFClCF_3$; and perfluoroalkanes such as octafluorocyclobutane, $CF_3CF_2CF_2CF_3$ and $CF_3CF_2CF_2CF_2CF_2CF_3$; and $C_4F_4H_4$, $C_4F_8H_2$, $C_5F_{11}C_5F_{10}H_2$, $C_6F_{13}H$, $C_6F_{12}H_2$, and $C_6F_9H_5$. Specifically preferred are hydrofluorocarbons such as 1,1,2,2-tetrafluorocyclobutane, $CF_2HCF_2CF_2CF_2H$, $CF_3CFHCF_2CF_2CF_3$, $CF_3CF_2CF_2CF_2CF_2$, $CF_3CF_2CFHCF_2CF_3$, $CF_3CFHCFHCF_2CF_3$, $CF_2HCF_2CF_2CF_2F_2H$, $CF_2HCFHCF_2CF_3$, $CF_3CF_2CF_2CF_2CF_2CF_2H$, $CF_3CH(CF_3)$ $CF_2CF_2CF_3$, $CF_3CF(CF_3)$ $CFHCF_2CF_3$, $CF_3CF(CF_3)CFHCFHCF_3$, $CF_3CH(CF_3)$ $CFHCF_2CF_3$, $CF_2HCF_2CF_2CF_2CF_2CF_2H$, and $CF_3CF_2CF_2CF_2CH_2CH_3$; and hydrofluoroalkyl ethers such as $CF_3CH_2OCF_2CHF_2$, $CHF_2CF_2CH_2OCF_2CHF_2$, and $CF_3CF_2CH_2OCF_2CHF_2$. In particular, perfluoroalkanes such as octafluorocyclobutane are preferred because they less cause chain transfer reactions in the polymerization.

The reaction temperature in the polymerization is preferably 20° C. to 50° C., more preferably 32° C. or higher, and still more preferably 34° C. or higher. In contrast, the reaction temperature is more preferably 45° C. or lower, and still more preferably 40° C. or lower. Too high a reaction temperature may generate low molecular weight components during the reaction, causing foaming or discoloration during extrusion molding. Too low a reaction temperature may fail to achieve a sufficient reaction rate, which is not suited for industrial uses.

EXAMPLES

The present invention will be described in detail hereinbelow referring to, but not limited to, the following examples.

The proportions of the respective monomers in the examples and the comparative examples were calculated from the chart obtained by 19F-NMR at 300 MHz using a polymer in the melted form.

Example 1

A 1000-L-capacity autoclave was charged with 312 L of distilled water and sufficiently purged with nitrogen. Then, 212 kg of octafluorocyclobutane was charged therein, and the temperature in the system was maintained at 35° C. and the stirring rate was maintained at 130 rpm. Thereafter, a gas mixture of tetrafluoroethylene (TFE)/ethylene (Et) (=79/21 mol %) was charged until the pressure in the system reached 1.28 MPaG. Further, 1.5 kg of perfluoro(1,1,5-trihydro-1-pentene) ($CH_2$=$CF(CF_2)_3H$) and 1.3 kg of cyclohexane were charged, and then 1.25 kg of di-sec-butyl peroxydicarbonate (SBP) was charged, so that the polymerization was started. Since the pressure in the system dropped as the polymerization proceeded, a gas mixture of tetrafluoroethylene/ethylene (=56.0/44.0 mol %) was continually supplied to maintain the pressure in the system at 1.28 MPaG. Also, 8.5 kg in total of perfluoro(1,1,5-trihydro-1-pentene) was continually supplied to continue the polymerization. After 15 hours from the start of the polymerization, the pressure was released to the atmospheric pressure. Then, the reaction product was washed with water and dried, so that 200 kg of ETFE powder was obtained. The melt flow rate (MFR) of the resulting ETFE was measured using a melt indexer (Toyo Seiki Seisaku-sho, Ltd.) in conformity with ASTM D3159, and it was 14.5 g/10 min. The melting point of the resulting ETFE was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 264° C. The ratio (by mole) of the monomers in the resulting composition was TFE/Et/$CH_2$=$CF(CF_2)_3H$=55.0/43.5/1.5.

Then, the composition was melt-extruded using a φ30-mm extruder at a cylinder temperature of 340° C. and a rate of 50 g/min, and the state of foaming and the degree of discoloration of the resin extruded from the extruder were visually observed. The observation found neither foaming nor discoloration.

Example 2

A 174-L-capacity autoclave was charged with 34 L of distilled water and sufficiently purged with nitrogen. Then, 30.4 kg of perfluorocyclobutane, 0.95 kg of perfluoro(propyl vinyl ether) ($CF_2$=$CFOCF_2CF_2CF_3$) (PPVE), and 1.7 kg of methanol were charged therein, and the temperature in the system was maintained at 35° C. and the stirring rate was maintained at 200 rpm. Thereafter, tetrafluoroethylene (TFE) was injected until the pressure reached 0.6 MPaG, and then 0.068 kg of di-sec-butyl peroxydicarbonate (SBP) was charged, so that the polymerization was started. Since the pressure in the system dropped as the polymerization proceeded, TFE was continually supplied to keep the pressure constant. PPVE was also added in an amount of 0.065 kg per hour, and the polymerization was continued for 17 hours. The pressure was released to the atmospheric pressure, and then the resulting reaction product was washed with water and dried, so that 30 kg of PFA powder was obtained. The melt flow rate (MFR) of the resulting PFA was measured using a melt indexer (Toyo Seiki Seisaku-sho, Ltd.) in conformity with ASTM D3307, and it was 15 g/10 min. The melting point of the resulting PFA was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 300° C. The ratio (by mole) of the monomers in the resulting composition was TFE/PPVE=98.0/2.0.

Then, the composition was melt-extruded using a $\phi$30-mm extruder at a cylinder temperature of 400° C. and a rate of 50 g/min, and the state of foaming and the degree of discoloration of the resin extruded from the extruder were visually observed. The observation found neither foaming nor discoloration.

Example 3

A 1336-liter-capacity stirring-type glass-lining autoclave equipped with a jacket was demineralized and deoxidized, and then charged with 360 liters of pure water. Stirring was started and the internal space was sufficiently purged with pure nitrogen. The container was then evacuated and charged with 360 kg of hexafluoropropylene (HFP). Subsequently, 3.5 kg of perfluoro(propyl vinyl ether) (PPVE) was injected, the temperature in the container was adjusted to 35° C. (i.e., the reaction temperature), and tetrafluoroethylene (TFE) was injected until the pressure reached 1.27 MPaG. Then, 1.05 kg of di-sec-butyl peroxydicarbonate (SBP) as an initiator and 0.7 kg of methanol as a molecular weight adjuster were injected, so that the polymerization was started. In the course of the reaction, a monomer mixture of TFE and HFP (ratio (by mole): TFE:HFP=86:14) was successively added to keep the pressure in the system constant. Simultaneously, ten 360-g portions of PPVE were additionally injected in accordance with the amount of the monomer mixture added. Sixteen hours later, when 390 kg in total of TFE, HEP, and PPVE were charged, the reaction was finished. The monomers were purged and the resulting polymer was isolated, washed, and dried, so that 360 kg of FEP powder was obtained.

The melt flow rate (MFR) of the resulting FEP was measured using a melt indexer (Toyo Seiki Seisaku-sho, Ltd.) in conformity with ASTM D3307, and it was 21 g/10 min. The melting point of the resulting FEP was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 250° C. The ratio (by mole) of the monomers in the resulting composition was TFE/HFP/PPVE=91.5/8.1/0.4.

Then, the composition was melt-extruded using a $\phi$30-mm extruder at a cylinder temperature of 390° C. and a rate of 50 g/min, and the state of foaming and the degree of discoloration of the resin extruded from the extruder were visually observed. The observation found neither foaming nor discoloration.

Example 4

A 10-L-capacity stainless-steel polymerization tank was evacuated and charged with 10 kg of chlorotrifluoroethylene (CTFE), and then the internal temperature was adjusted to 35° C. Next, 11.3 g of di-sec-butyl peroxydicarbonate (SBP) was injected into the polymerization tank, so that the polymerization was started. After 35 hours from the start of the polymerization, non-reacted monomers were purged, and the reaction mixture collected from the polymerization tank was washed and dried, so that 6.8 kg of PCTFE powder was obtained.

The melt flow rate (MFR) of the resulting PCTFE was measured using a melt indexer (Toyo Seiki Seisaku-sho, Ltd.) in conformity with ASTM D7472, and it was 1 g/10 min. The melting point of the resulting PCTFE was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 213° C. The ratio (by mole) of the monomers in the resulting composition was CTFE=100.

Then, the composition was melt-extruded using a $\phi$30-mm extruder at a cylinder temperature of 300° C. and a rate of 10 g/min, and the state of foaming and the degree of discoloration of the resin extruded from the extruder were visually observed. The observation found neither foaming nor discoloration.

Example 5

A 1000-L-capacity autoclave was charged with 312 L of distilled water and sufficiently purged with nitrogen. Then, 212 kg of octafluorocyclobutane was charged therein, and the temperature in the system was maintained at 25° C. and the stirring rate was maintained at 130 rpm. Thereafter, a gas mixture of tetrafluoroethylene (TFE)/ethylene (Et) (=79/21 mol %) was charged until the pressure in the system reached 1.13 MPaG. Further, 1.5 kg of perfluoro(1,1,5-trihydro-1-pentene) ($CH_2=CF(CF_2)_3H$) and 1.7 kg of cyclohexane were charged, and then 1.25 kg of di-sec-butyl peroxydicarbonate (SBP) was charged, so that the polymerization was started. Since the pressure in the system dropped as the polymerization proceeded, a gas mixture of tetrafluoroethylene/ethylene (=56.0/44.0 mol %) was continually supplied to maintain the pressure in the system at 1.13 MPaG. Also, 8.5 kg in total of perfluoro(1,1,5-trihydro-1-pentene) was continually supplied to continue the polymerization. After 36 hours from the start of the polymerization, the pressure was released to the atmospheric pressure. Then, the reaction product was washed with water and dried, so that 200 kg of ETFE powder was obtained.

The melt flow rate (MFR) of the resulting ETFE was measured using a melt indexer (Toyo Seiki Seisaku-sho, Ltd.) in conformity with ASTM D3159, and it was 14 g/10 min. The melting point of the resulting ETFE was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 264° C. The ratio (by mole) of the monomers in the resulting composition was TFE/Et/$CH_2=CF(CF_2)_3H$=55.0/43.5/1.5.

Then, the composition was melt-extruded using a φ30-mm extruder at a cylinder temperature of 340° C. and a rate of 50 g/min, and the state of foaming and the degree of discoloration of the resin extruded from the extruder were visually observed. The observation found neither foaming nor discoloration.

Example 6

A 1000-L-capacity autoclave was charged with 312 L of distilled water and sufficiently purged with nitrogen. Then, 212 kg of octafluorocyclobutane was charged therein, and the temperature in the system was maintained at 60° C. and the stirring rate was maintained at 130 rpm. Thereafter, a gas mixture of tetrafluoroethylene (TFE)/ethylene (Et) (=79/21 mol %) was charged until the pressure in the system reached 1.70 MPaG. Further, 1.5 kg of perfluoro(1,1,5-trihydro-1-pentene) ($CH_2=CF(CF_2)_3H$) and 1.1 kg of cyclohexane were charged, and then 1.25 kg of di-sec-butyl peroxydicarbonate (SBP) was charged, so that the polymerization was started. Since the pressure in the system dropped as the polymerization proceeded, a gas mixture of tetrafluoroethylene/ethylene (=56.0/44.0 mol %) was continually supplied to maintain the pressure in the system at 1.70 MPaG. Also, 8.5 kg in total of perfluoro(1,1,5-trihydro-1-pentene) was continually supplied to continue the polymerization. After 25 hours from the start of the polymerization, the pressure was released to the atmospheric pressure. Then, the reaction product was washed with water and dried, so that 200 kg of ETFE powder was obtained.

The melt flow rate (MFR) of the resulting ETFE was measured using a melt indexer (Toyo Seiki Seisaku-sho, Ltd.) in conformity with ASTM D3159, and it was 15 g/10 min. The melting point of the resulting ETFE was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 264° C. The ratio (by mole) of the monomers in the resulting composition was TFE/Et/$CH_2=CF(CF_2)_3H$=55.0/43.5/1.5.

Then, the composition was melt-extruded using a φ30-mm extruder at a cylinder temperature of 340° C. and a rate of 50 g/min, and the state of foaming and the degree of discoloration of the resin extruded from the extruder were visually observed. The observation found generation of many small bubbles and slightly brown discoloration.

Example 7

A 1000-L-capacity autoclave was charged with 312 L of distilled water and sufficiently purged with nitrogen. Then, 212 kg of octafluorocyclobutane was charged therein, and the temperature in the system was maintained at 35° C. and the stirring rate was maintained at 130 rpm. Thereafter, a gas mixture of tetrafluoroethylene (TFE)/ethylene (Et) (=79/21 mol %) was charged until the pressure in the system reached 1.28 MPaG. Further, 1.5 kg of perfluoro(1,1,5-trihydro-1-pentene) ($CH_2=CF(CF_2)_3H$) and 1.3 kg of cyclohexane were charged, and then 1.42 kg of di-2-ethoxyethyl peroxydicarbonate (EEP) was charged, so that the polymerization was started. Since the pressure in the system dropped as the polymerization proceeded, a gas mixture of tetrafluoroethylene/ethylene (=56.0/44.0 mol %) was continually supplied to maintain the pressure in the system at 1.28 MPaG. Also, 8.5 kg in total of perfluoro(1,1,5-trihydro-1-pentene) was continually supplied to continue the polymerization. After 15 hours from the start of the polymerization, the pressure was released to the atmospheric pressure. Then, the reaction product was washed with water and dried, so that 200 kg of ETFE powder was obtained.

The melt flow rate (MFR) of the resulting ETFE was measured using a melt indexer (Toyo Seiki Seisaku-sho, Ltd.) in conformity with ASTM D3159, and it was 14.5 g/10 min. The melting point of the resulting ETFE was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 264° C. The ratio (by mole) of the monomers in the resulting composition was TFE/Et/$CH_2=CF(CF_2)_3H$=55.0/43.5/1.5.

Then, the composition was melt-extruded using a φ30-mm extruder at a cylinder temperature of 340° C. and a rate of 50 g/min, and the state of foaming and the degree of discoloration of the resin extruded from the extruder were visually observed. The observation found neither foaming nor discoloration.

Example 8

A 1000-L-capacity autoclave was charged with 312 L of distilled water and sufficiently purged with nitrogen. Then, 212 kg of octafluorocyclobutane was charged therein, and the temperature in the system was maintained at 35° C. and the stirring rate was maintained at 130 rpm. Thereafter, a gas mixture of tetrafluoroethylene (TFE)/ethylene (Et) (=79/21 mol %) was charged until the pressure in the system reached 1.28 MPaG. Further, 1.5 kg of perfluoro(1,1,5-trihydro-1-pentene) ($CH_2=CF(CF_2)_3H$) and 0.2 kg of cyclohexane were charged, and then 11.25 kg of di-sec-butyl peroxydicarbonate (SBP) was charged, so that the polymerization was started. Since the pressure in the system dropped as the polymerization proceeded, a gas mixture of tetrafluoroethylene/ethylene (=56.0/44.0 mol %) was continually supplied to maintain the pressure in the system at 1.28 MPaG. Also, 8.5 kg in total of perfluoro(1,1,5-trihydro-1-pentene) was continually supplied to continue the polymerization. After 4 hours from the start of the polymerization, the pressure was released to the atmospheric pressure. Then, the reaction product was washed with water and dried, so that 200 kg of ETFE powder was obtained. The melt flow rate (MFR) of the resulting ETFE was measured using a melt indexer (Toyo Seiki Seisaku-sho, Ltd.) in conformity with ASTM D3159, and it was 14.5 g/10 min. The melting point of the resulting ETFE was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 264° C. The ratio (by mole) of the monomers in the resulting composition was TFE/Et/$CH_2=CF(CF_2)_3H$=55.0/43.5/1.5.

Then, the composition was melt-extruded using a φ30-mm extruder at a cylinder temperature of 340° C. and a rate of 50 g/min, and the state of foaming and the degree of discoloration of the resin extruded from the extruder were visually observed. The observation found neither foaming nor discoloration.

Comparative Example 1

A 1000-L-capacity autoclave was charged with 312 L of distilled water and sufficiently purged with nitrogen. Then, 212 kg of octafluorocyclobutane was charged therein, and the temperature in the system was maintained at 35° C. and the stirring rate was maintained at 130 rpm. Thereafter, a gas mixture of tetrafluoroethylene (TFE)/ethylene (Et) (=79/21 mol %) was charged until the pressure in the system reached 1.28 MPaG. Further, 1.5 kg of perfluoro(1,1,5-trihydro-1-pentene) (CH$_2$=CF(CF$_2$)$_3$H) and 1.7 kg of cyclohexane were charged, and then 1.10 kg of di-n-propyl peroxydicarbonate (NPP) was charged, so that the polymerization was started. Since the pressure in the system dropped as the polymerization proceeded, a gas mixture of tetrafluoroethylene/ethylene (=56.0/44.0 mol %) was continually supplied to maintain the pressure in the system at 1.28 MPaG. Also, 8.5 kg in total of perfluoro(1,1,5-trihydro-1-pentene) was continually supplied to continue the polymerization. After 25 hours from the start of the polymerization, the pressure was released to the atmospheric pressure. Then, the reaction product was washed with water and dried, so that 200 kg of ETFE powder was obtained.

The melt flow rate (MFR) of the resulting ETFE was measured using a melt indexer (Toyo Seiki Seisaku-sho, Ltd.) in conformity with ASTM D3159, and it was 14.5 g/10 min. The melting point of the resulting ETFE was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 264° C. The ratio (by mole) of the monomers in the resulting composition was TFE/Et/CH$_2$=CF(CF$_2$)$_3$H=55.0/43.5/1.5.

Then, the composition was melt-extruded using a φ30-mm extruder at a cylinder temperature of 340° C. and a rate of 50 g/min, and the state of foaming and the degree of discoloration of the resin extruded from the extruder were visually observed. The observation found no discoloration but found significant foaming.

Comparative Example 2

A 174-L-capacity autoclave was charged with 34 L of distilled water and sufficiently purged with nitrogen. Then, 30.4 kg of perfluorocyclobutane, 0.95 kg of perfluoro(propyl vinyl ether) (CF$_2$=CFOCF$_2$CF$_2$CF$_3$) (PPVE), and 2.2 kg of methanol were charged therein, and the temperature in the system was maintained at 35° C. and the stirring rate was maintained at 200 rpm. Thereafter, tetrafluoroethylene (TFE) was injected until the pressure reached 0.6 MPaG, and 0.060 kg of di-n-propyl peroxydicarbonate (NPP) was charged, so that the polymerization was started. Since the pressure in the system dropped as the polymerization proceeded, TFE was continually supplied to keep the pressure constant. PPVE was also added in an amount of 0.065 kg per hour, and the polymerization was continued for 28 hours. Then, the pressure was released to the atmospheric pressure, and the resulting reaction product was washed with water and dried, so that 30 kg of PFA powder was obtained.

The melt flow rate (MFR) of the resulting PFA was measured using a melt indexer (Toyo Seiki Seisaku-sho, Ltd.) in conformity with ASTM D3307, and it was 15 g/10 min. The melting point of the resulting PFA was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 300° C. The ratio (by mole) of the monomers in the resulting composition was TFE/PPVE=98.0/2.0.

Then, the composition was melt-extruded using a φ30-mm extruder at a cylinder temperature of 400° C. and a rate of 50 g/min, and the state of foaming and the degree of discoloration of the resin extruded from the extruder were visually observed. The observation found no discoloration, but found significant foaming.

Comparative Example 3

A 1336-liter-capacity stirring-type glass-lining autoclave equipped with a jacket was demineralized and deoxidized, and then charged with 360 liters of pure water. Stirring was started and the internal space was sufficiently purged with pure nitrogen. The container was then evacuated and charged with 360 kg of hexafluoropropylene (HFP). Subsequently, 3.5 kg of perfluoro(propyl vinyl ether) (PPVE) was injected, the temperature in the tank was adjusted to 35° C. (i.e., the reaction temperature), and tetrafluoroethylene (TFE) was injected until the pressure reached 1.27 MPaG. Then, 0.93 kg of di-n-propyl peroxydicarbonate (NPP) as an initiator and 0.9 kg of methanol as a molecular weight adjuster were injected, so that the polymerization was started. In the course of the reaction, a monomer mixture of TFE and HFP (ratio (by mole): TFE:HFP=86:14) was successively added to keep the pressure in the system constant. Simultaneously, ten 360-g portions of PPVE were additionally injected in accordance with the amount of the monomer mixture added. Twenty seven hours later, when 390 kg in total of TFE, HEP, and PPVE were charged, the reaction was finished. The monomers were purged and the resulting polymer was isolated, washed, and dried, so that 360 kg of FEP powder was obtained.

The melt flow rate (MFR) of the resulting FEP was measured using a melt indexer (Toyo Seiki Seisaku-sho, Ltd.) in conformity with ASTM D3307, and it was 21 g/10 min. The melting point of the resulting FEP was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 250° C. The ratio (by mole) of the monomers in the resulting composition was TFE/HFP/PPVE=91.5/8.1/0.4.

Then, the composition was melt-extruded using a φ30-mm extruder at a cylinder temperature of 390° C. and a rate of 50 g/min, and the state of foaming and the degree of discoloration of the resin extruded from the extruder were visually observed. The observation found no discoloration, but found significant foaming.

Comparative Example 4

A 10-L-capacity stainless-steel polymerization tank was evacuated, and then charged with 10 kg of chlorotrifluoroethylene (CTFE) and the internal temperature was adjusted to 35° C. Thereafter, 10 g of di-n-propyl peroxydicarbonate (NPP) was injected into the reaction container, so that the polymerization was started. After 60 hours from the start of the polymerization, unreacted monomers were purged, and the reaction mixture collected from the reaction container was washed and dried, so that 6.8 kg of PCTFE powder was obtained.

The melt flow rate (MFR) of the resulting PCTFE was measured using a melt indexer (Toyo Seiki Seisaku-sho, Ltd.) in conformity with ASTM D7472, and it was 1 g/10 min. The melting point of the resulting PCTFE was determined on the basis of the maximum value on a heat-of-fusion curve drawn using a differential scanning calorimeter (DSC) (trade name: RDC220, Seiko Instruments Inc.) at a temperature-increasing rate of 10° C./min, and it was 213° C. The ratio (by mole) of the monomers in the resulting composition was CTFE=100.

Then, the composition was melt-extruded using a φ30-mm extruder at a cylinder temperature of 300° C. and a rate of 10 g/min, and the state of foaming and the degree of discoloration of the resin extruded from the extruder were visually observed. The observation found significant foaming and brown discoloration.

The results of the respective examples and comparative examples are shown in the following Table 1.

TABLE 1

|  |  | Example 1 | Example 2 | Example 3 | Example 4 | Example 5 | Example 6 |
|---|---|---|---|---|---|---|---|
| Type of polymer |  | ETFE | PFA | FEP | PCTFE | ETFE | ETFE |
| Initiator |  | SBP | SBP | SBP | SBP | SBP | SBP |
| Polymerization temperature | ° C. | 35 | 35 | 35 | 35 | 25 | 60 |
| Amount of polymer | kg | 200 | 30 | 360 | 6.8 | 200 | 200 |
| Reaction time | hr | 15 | 17 | 16 | 35 | 36 | 25 |
| Reaction rate per mole of initiator | kg/ (hr · mol) | 2.5 | 6.1 | 5.0 | 4.0 | 1.0 | 1.5 |
| MFR | g/10 min | 14.5 | 15 | 21 | 1 | 14 | 15 |
| Melting point | ° C. | 264 | 300 | 250 | 213 | 264 | 264 |
| Composition | mol % | TFE/Et/ $CH_2=CF(CF_2)_3H$ = 55.0/43.5/1.5 | TFE/PPVE = 98.0/2.0 | TFE/HFP/PPVE = 91.5/8.1/0.4 | CTFE = 100 | TFE/Et/ $CH_2=CF(CF_2)_3H$ = 55.0/43.5/1.5 | TFE/Et/ $CH_2=CF(CF_2)_3H$ = 55.0/43.5/1.5 |
| Foaming |  | ○ | ○ | ○ | ○ | ○ | Δ |
| Discoloration |  | ○ | ○ | ○ | ○ | ○ | Δ |

|  |  | Example 7 | Example 8 | Comparative Example 1 | Comparative Example 2 | Comparative Example 3 | Comparative Example 4 |
|---|---|---|---|---|---|---|---|
| Type of polymer |  | ETFE | ETFE | ETFE | PFA | FEP | PCTFE |
| Initiator |  | EEP | SBP | NPP | NPP | NPP | NPP |
| Polymerization temperature | ° C. | 35 | 35 | 35 | 35 | 35 | 35 |
| Amount of polymer | kg | 200 | 200 | 200 | 30 | 360 | 6.8 |
| Reaction time | hr | 15 | 4 | 25 | 28 | 27 | 60 |
| Reaction rate per mole of initiator | kg/ (hr · mol) | 2.5 | 1.0 | 1.5 | 3.7 | 3.0 | 2.3 |
| MFR | g/10 min | 14.5 | 14.5 | 14.5 | 15 | 21 | 1 |
| Melting point | ° C. | 264 | 264 | 264 | 300 | 250 | 213 |
| Composition | mol % | TFE/Et/ $CH_2=CF(CF_2)_3H$ = 55.0/43.5/1.5 | TFE/Et/ $CH_2=CF(CF_2)_3H$ = 55.0/43.5/1.5 | TFE/Et/ $CH_2=CF(CF_2)_3H$ = 55.0/43.5/1.5 | TFE/PPVE = 98.0/2.0 | TFE/HFP/PPVE = 91.5/8.1/0.4 | CTFE = 100 |
| Foaming |  | ○ | ○ | x | x | x | x |
| Discoloration |  | ○ | ○ | ○ | ○ | ○ | x |

The symbols in Table 1 mean as follows.
Foaming "○": No foaming observed
Foaming "Δ": Many small bubbles generated
Foaming "x": Significant foaming observed
Discoloration "○": No discoloration observed
Discoloration "Δ": Slightly brown discoloration observed
Discoloration "x": Brown discoloration observed The value "reaction rate per mole of initiator" in Table 1 was calculated by the following formula.

Reaction rate per mole of initiator (kg/(hr·mol))= (Amount (kg) of polymer obtained)/{(polymerization reaction time (hr))×(Amount (mol) of polymerization initiator used)}

INDUSTRIAL APPLICABILITY

The method of producing a fluoropolymer of the present invention can more efficiently provide a fluoropolymer essentially comprising a tetrafluoroethylene or chlorotrifluoroethylene unit, improve the moldability in extrusion molding, and suppress discoloration. Thus, the method can suitably be used as a method of producing a fluoropolymer essentially comprising a tetrafluoroethylene or chlorotrifluoroethylene unit.

The invention claimed is:
1. A method of producing a fluoropolymer, comprising producing a fluoropolymer by polymerizing only the following monomers:
(i) tetrafluoroethylene or chlorotrifluoroethylene and
(ii) at least one monomer selected from the group consisting of: ethylene; chlorotrifluoroethylene; vinyl fluoride; hexafluoropropylene; hexafluoroisobutene; monomers represented by $CH_2=CX^1(CF_2)_nX^2$, wherein $X^1$ is H or F, $X^2$ is H, F, or Cl, and n is an integer of 1 to 10; perfluoro(alkyl vinyl ethers) represented by $CF_2=CF-ORf^1$, wherein $Rf^1$ is a C1-C10 perfluoroalkyl group or a C1-C17 perfluoroalkoxy alkyl group; and alkyl perfluorovinyl ether derivatives represented by $CF_2=CF-OCH_2-Rf^2$, wherein $Rf^2$ is a C1-C5 perfluoroalkyl group, in the presence of a peroxydicarbonate,
the peroxydicarbonate being represented by the following formula:

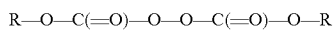

R—O—C(=O)—O—O—C(=O)—O—R wherein R's may be the same as or different from each other and individually represent a C4 alkyl group or alkoxy alkyl group,
wherein the fluoropolymer is a fluororesin which has a melting point of 160° C. to 320° C., and wherein the peroxydicarbonate is di-sec-butyl peroxydicarbonate or di-2-ethoxyethyl peroxydicarbonate.

2. The method of producing a fluoropolymer according to claim 1,
wherein the tetrafluoroethylene is polymerized with ethylene.

3. The method of producing a fluoropolymer according to claim 1,
wherein the tetrafluoroethylene is polymerized with a perfluoro(alkyl vinyl ether) represented by $CF_2=CF-ORf^1$ wherein $Rf^1$ is a C1-C10 perfluoroalkyl group or a C1-C17 perfluoroalkoxy alkyl group.

4. The method of producing a fluoropolymer according to claim 1,
wherein the tetrafluoroethylene is polymerized with hexafluoropropylene.

5. The method of producing a fluoropolymer according to claim 1,
wherein the chlorotrifluoroethylene is polymerized.

6. The method of producing a fluoropolymer according to claim 1,
wherein the polymerization is performed by emulsion polymerization, suspension polymerization, solution polymerization, or bulk polymerization.

* * * * *